(12) United States Patent
Herhaus

(10) Patent No.: US 7,698,963 B2
(45) Date of Patent: Apr. 20, 2010

(54) FORCE-SENSING DEVICE

(75) Inventor: Jürgen Herhaus, Radevormwald (DE)

(73) Assignee: Honigmann Industrielle Elektronik GmbH, Wuppertal (DE)

( * ) Notice: Subject to any disclaimer, the term of this patent is extended or adjusted under 35 U.S.C. 154(b) by 491 days.

(21) Appl. No.: 10/574,621

(22) PCT Filed: Oct. 6, 2004

(86) PCT No.: PCT/EP2004/011162

§ 371 (c)(1),
(2), (4) Date: Apr. 5, 2006

(87) PCT Pub. No.: WO2005/036117

PCT Pub. Date: Apr. 21, 2005

(65) Prior Publication Data

US 2007/0051190 A1    Mar. 8, 2007

(30) Foreign Application Priority Data

Oct. 6, 2003   (DE) ................. 103 46 811

(51) Int. Cl.
*G01L 1/04* (2006.01)
(52) U.S. Cl. .................. 73/862.633; 73/862.636; 73/862.627; 177/211
(58) Field of Classification Search ........... 73/862.391, 73/862.451, 862.471, 862.472–862.474, 73/862.636–862.638; 177/211
See application file for complete search history.

(56) References Cited

U.S. PATENT DOCUMENTS

| 3,577,779 | A | * | 5/1971 | Laimins | 73/862.633 |
| 4,089,217 | A | * | 5/1978 | Rahav et al. | 73/862.633 |
| 4,326,424 | A | * | 4/1982 | Koenig | 73/862.474 |
| 4,674,339 | A | | 6/1987 | Hatamura et al. | 73/862.04 |
| 5,190,116 | A | * | 3/1993 | Reichow | 177/211 |
| 6,363,798 | B1 | | 4/2002 | Gitis et al. | 73/862.391 |
| 2002/0069708 | A1 | * | 6/2002 | McKenna | 73/862.637 |
| 2003/0029253 | A1 | | 2/2003 | Norling et al. | 73/862.627 |
| 2004/0221664 | A1 | * | 11/2004 | Kurtz et al. | 73/862.637 |

FOREIGN PATENT DOCUMENTS

| DE | 4332588 A1 | * | 3/1995 |
| EP | 0 621 469 | | 10/1994 |
| GB | 2 101 753 | | 1/1983 |
| JP | 59 204 732 | | 11/1984 |

\* cited by examiner

*Primary Examiner*—Lisa M Caputo
*Assistant Examiner*—Punam Patel
(74) *Attorney, Agent, or Firm*—Gudrun E. Huckett

(57) ABSTRACT

A force-sensing device has a yoke having a location of force introduction for a force to be measured acting in a predetermined direction. A measuring spring has a first end rigidly connected to the yoke and is elastically deformable by the force to be measured. The measuring spring has a second end arranged on a support rigidly connectable to a machine frame. First predetermined measuring locations are provided that detect and evaluate a deformation of the measuring spring caused by the force to be measured. Parallel and spaced apart bending springs are connected to the yoke in such a way that the yoke is always guided in parallel in a transverse direction that is transverse to the predetermined direction of the force to be measured. Second predetermined measuring locations are provided on the bending springs and detect a transverse deformation caused by a force in the transverse direction.

17 Claims, 4 Drawing Sheets

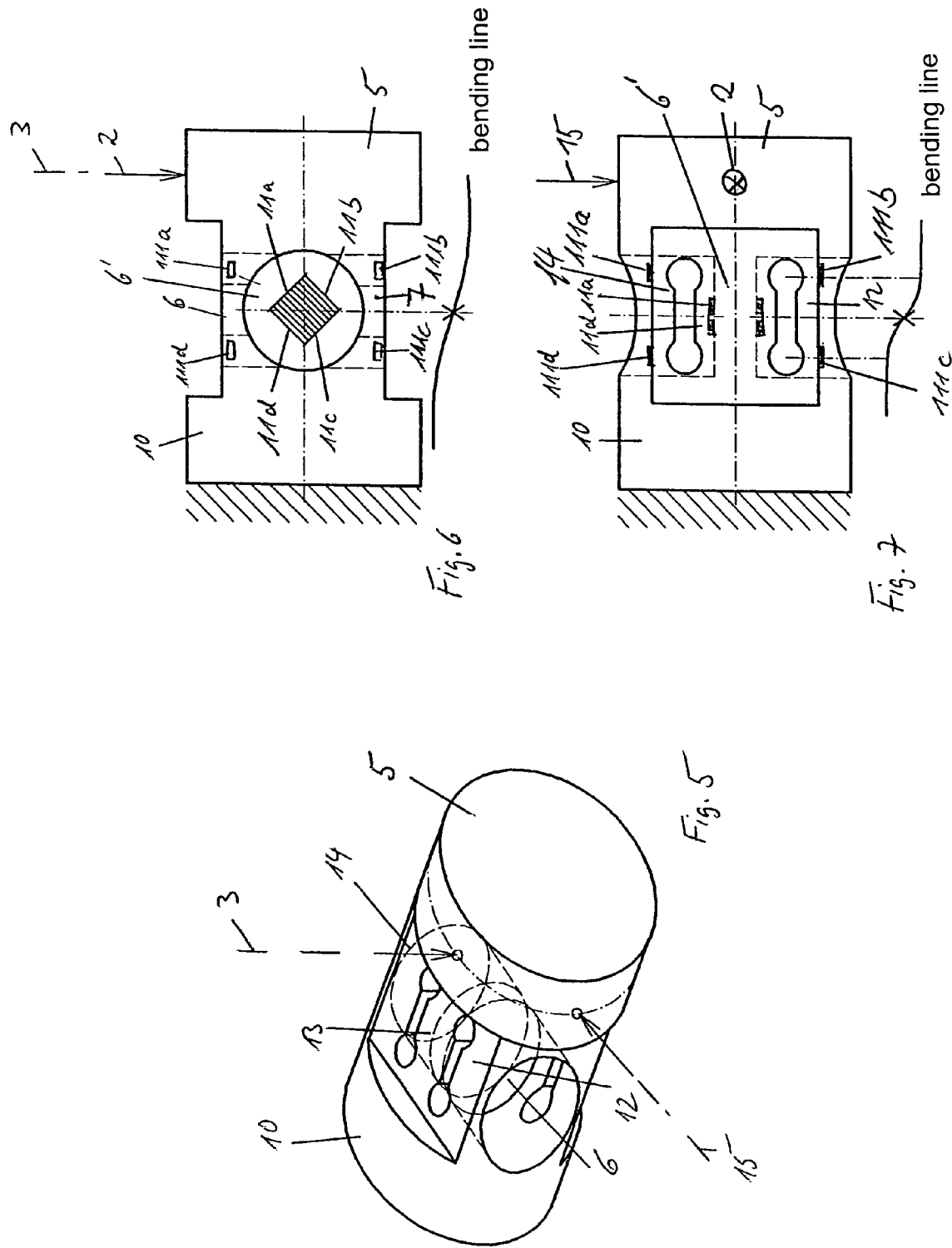

FORCE-SENSING DEVICE

BACKGROUND OF THE INVENTION

The present invention relates to a force-sensing device for measuring a force that acts in a predetermined direction on a location of force introduction of the force-sensing device, wherein the location of force introduction is rigidly connected by a yoke with at least one measuring spring that is elastically deformable by the force introduction, while the measuring spring(s) with the other end is/are arranged on the support that is designed to be rigidly connectable to the machine frame and wherein the force-caused deformation of the measuring spring(s) is detected at predetermined measuring locations and evaluated.

Such force-sensing device is disclosed in EP 0 621 469 B1. This force-sensing device has a special feature in that, for measuring a force expected to act in a predetermined direction, a pair of measuring springs are provided that are parallel to one another and spaced apart from one another. This arrangement is referred to as a "double bending beam"; however, in connection with the present invention this is not to be understood as a limitation to such arrangements of measuring springs. Therefore, for measuring such forces, all conceivable measuring spring arrangements are taken into consideration, i.e., also single bending beams, shearing force sensors, torsion sensors etc.

An important feature of this known force-sensing device—without being limited to it—is the arrangement of two parallel measuring springs that are connected with one end to a support that is to be connected rigidly to the machine frame. The other ends of the measuring springs are connected to one another by means of a yoke. By means of the yoke, the force to be measured is introduced into the system.

With this arrangement of support, measuring springs, and yoke, the yoke is displaced always parallel to itself when loaded. Such force-sensing devices have significant advantages with regard to stiffness and reproducible signal generation. In particular, they are able to detect high nominal loads even for minimal deflections.

Of course, this does not apply in the case of other possible measuring arrangements (single bending arrangement, shearing force sensor, torsion sensor etc.); however, they are suitable for the present invention as well.

When the yoke is moreover provided with a rolling bearing seat, it is possible to very well manufacture with such a force-sensing device also so-called measuring rollers that are characterized in particular in that also the rolling bearing is always displaced parallel to itself under load.

It is therefore an object of the present invention to configure the known force-sensing device in such a way that, while maintaining the aforementioned known advantages of measuring springs of different designs, a high stiffness can be achieved even for load directions that are outside of the predetermined direction in which the force to be measured acts.

SUMMARY OF THE INVENTION

This object is solved by the invention in that the yoke is always guided in parallel in a transverse direction that is transverse to the predetermined direction of the force by means of at least one pair of bending springs that are parallel relative to one another and spaced apart from one another and in that these bending springs also have predetermined measuring locations where the deformation caused by a force in the transverse direction is detectable.

The invention provides the advantage that, in comparison to the stiffness values of known force-sensing devices, a stiffness that is four times greater can be obtained for transversely positioned force directions and comparable cross-sectional dimensions. This increase of stiffness therefore follows the requirement of achieving in the transverse direction only minimal deflections so that a high lateral load resistance is obtained.

In this connection, the ability to take up high lateral loads is not paired with surrendering anything for obtaining high nominal measuring loads.

This advantage is achieved in that in the transverse direction two bending springs that are parallel to one another and spaced apart from one another are provided that deform under a load in the transverse direction in the same way as the double bending beam provided—in the case of the known force-sensing device—for the measuring direction.

Since each of the transversely positioned bending springs is deformed to an S-shape under the transverse load and therefore has a bending line with two turning points, the force-sensing device according to the invention therefore counteracts the transverse force with a correspondingly high resistance that leads precisely to the comparatively minimal deflections despite correspondingly high transverse forces.

In this connection, even under the effect of the transverse load, the yoke that bends the bending springs is always displaced parallel to itself so that the force-sensing device is moreover excellently suitable for a combination with rolling bearings that can be arranged on appropriate rolling bearing seats of the yoke.

The exact parallel movement of the rolling bearings is, for example, required for measuring tasks on rollers when a displacement of the measuring roller that is free of secondary bending moment is an important factor. In such cases, it must be ensured that under the effect of transverse forces the strip edges of the strip do not deviate from the predetermined path as a result of an undesirable displacement of the measuring roller.

A compact configuration is provided when the additional bending springs extend between the yoke and the support. The bending springs that are provided for taking up the transverse forces extend between the support and the yoke like the at least one measuring spring that is provided for detecting the force-caused deformation.

The additional bending springs can therefore be connected as monolithic parts of the yoke and the support.

Especially advantageous, however, is a further embodiment in which the transversely positioned bending springs are machined by means of appropriate measurers out of the measuring spring or springs serving for detecting the force to be measured.

Even though this is basically not to be understood as a limitation of the invention, it is expressly stated that the bending springs can also serve for qualitative detection of the transverse forces or, depending on the mounting situation, can also serve "simply" for providing geometric parallel guiding of the yoke under the effect of a transverse force. In any case, the stiffness values of the bending springs can be manufactured in a defined way for every measuring task without having to give up the advantages of the double bending beam that is known in special configuration in the prior art and that is provided, only in the direction of the force to be measured, with two or even more parallel bending springs to be deformed to an S-shape.

For this purpose, it can also be expedient to select the section modulus of the bending springs in that direction that coincides with the transverse direction to be significantly higher than the section modulus of the measuring springs provided for force measurement. Such a force-sensing device would therefore be significantly stiffer in the transverse direction than in the measuring direction.

This measure can be expedient, for example, in so-called measuring rollers that are subjected to a significant dead load but in the measuring direction must take up only minimal nominal measuring forces for material and/or process technological reasons.

The position of the transverse direction relative to the direction of the predetermined force is essentially random as long as the transverse direction and predetermined force have an angle between them that is greater than 0 degrees (except 180 degrees).

For most applications, it should however be sufficient to configure the force-sensing device for transverse directions that are perpendicular to the direction of the force to be measured.

Especially advantageous is a further embodiment in which the measuring spring or springs provided for force measurement is/are provided with slots that extend on the one hand in the longitudinal direction of the measuring springs and on the other hand are positioned with their slot plane perpendicularly to the transverse direction.

In this way, the known measuring springs provided for force measurement are also used for generating the additional bending springs so that by means of the essentially known manufacturing technology of such force-sensing devices additionally also a high lateral load stiffness can be achieved.

A further embodiment of the invention provides a projecting support action on a machine frame.

For this purpose, it is proposed to configure the support to be of an annular shape and to secure the support by means of a mandrel on the machine frame which mandrel penetrates the annular recess of the support, wherein the mandrel has a head on the side facing away from the machine frame which head is connected to the outer side of the support.

This embodiment has particularly the advantage that the mandrel can be secured on the machine frame in random different rotational positions within an angular range of 360 degrees.

Advantageously, the mandrel is secured in a clamping socket that can be connected rigidly to the machine frame. This clamping socket has a fitted bore for the mandrel which is intercepted by a clamp bore. In the clamp bore a clamping jaw pair is arranged and engages two sides of the mandrel. This is achieved in that one clamping jaw is arranged on one side of the fitted bore and the other clamping jaw is arranged on the other side of the fitted bore.

As a result of the paired interaction between the clamping jaws, during the clamping process a relative rotation of the mandrel in the fitted bore is prevented. The clamping forces acting on the mandrel in the circumferential direction, respectively, compensate one another.

An advantageous further embodiment provides that the clamping jaw pair is to be actuated by a clamping screw whose shaft is seated in a through bore of one clamping jaw while the other clamping jaw has a threaded bore that matches the thread of the clamping screw.

This embodiment of the invention has the advantage that the clamping screw can extend completely within the clamping socket and is thus recessed within the envelope of the clamping socket.

The force-sensing device according to the present invention enables in particular also a modular configuration.

In this connection, it is additionally proposed that a counter flange of an extension axle can be mounted externally on the head of the mandrel by means of a screwed-on flange provided thereat.

At the end of the extension axle a further counter flange can be provided which serves for receiving a mirror-symmetrically arranged force-sensing device.

Since particularly the further embodiment, wherein the support is annular and is penetrated by a mandrel connectable rigidly to the machine frame, which mandrel is connectable by a head to an outer end of the support, can be designed independent of the pair of parallel bending springs, the possibility of a modular configuration of the entire force-sensing device provides also the advantage of manufacturing so-called measuring rollers; such measuring rollers are either not under the effect of transverse forces or the transverse forces have no effect on such measuring rollers.

Since particularly such measuring rollers with a single side support action are under the effect of their dead load, both configurations of the invention can be advantageous, depending on whether the transverse force is significant and/or must be taken into account.

In this connection, the cable placement is also of significant importance.

In this connection, it is expedient to provide the mandrel in the longitudinal area of the bending springs with a cable inlet opening that is intercepted by a longitudinal bore of the mandrel.

By means of these communicating bores, the cables can be guided out of the force-sensing device to the machine frame.

In the case of a measuring roller, the extension axle should also be hollow so that the measuring cable can be guided outwardly via this axle bore to the machine frame.

For a precise alignment of the force-sensing device in such a way that the measuring axis of the bending springs designed for force measurement coincides with the line of action of the force to be measured, it is proposed additionally that the mandrel has a key engaging surface that is preferably concentric to the mandrel axis.

BRIEF DESCRIPTION OF THE DRAWINGS

In the following the invention will be explained with the aid of embodiments in more detail.

It is shown in:

FIG. 5 a further embodiment of the invention;

FIG. 6 the embodiment according to FIG. 5 in a side view;

FIG. 7 the embodiment according to FIG. 5 in a top view.

DESCRIPTION OF PREFERRED EMBODIMENTS

Figure 1:
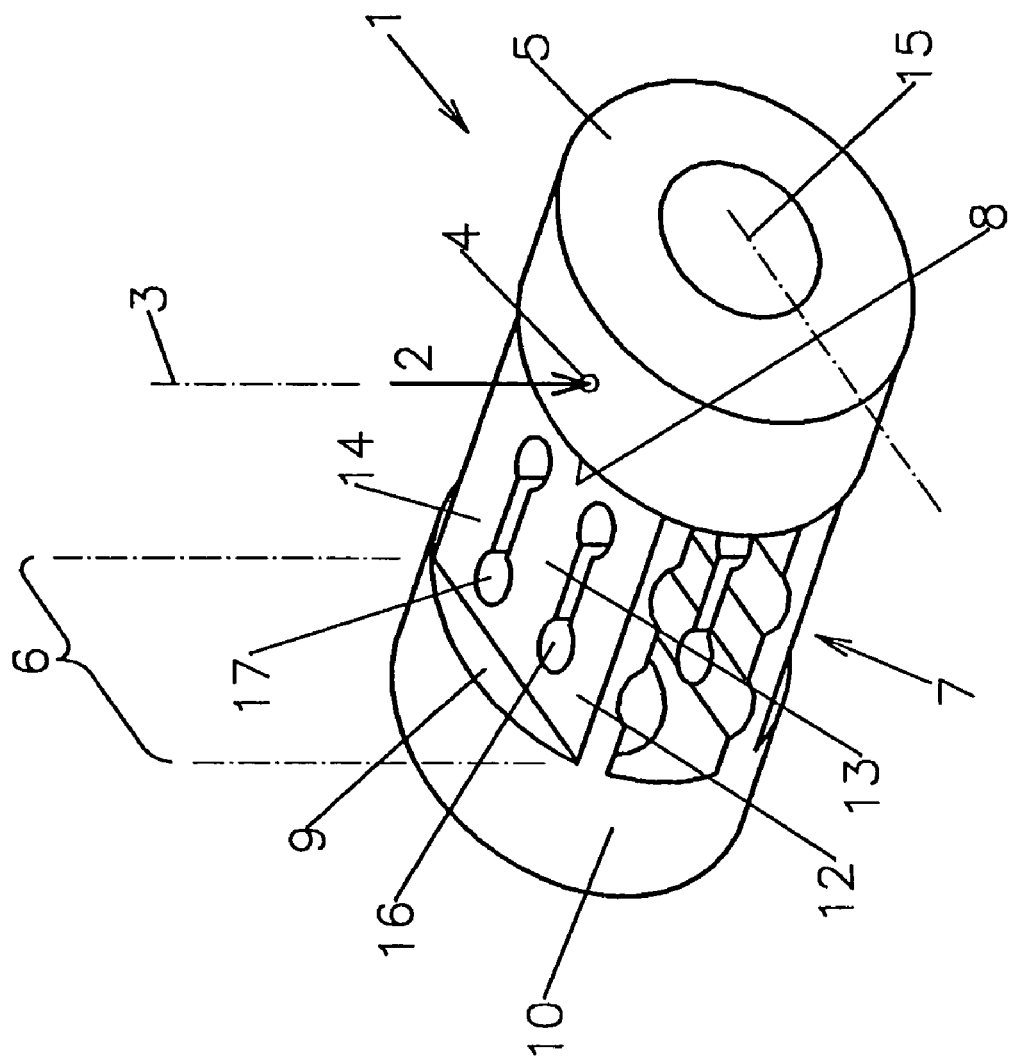
FIG. 1 a first embodiment of the invention.

If nothing else is mentioned, the following description always applies to all Figures. Same reference numerals refer to same parts.

The Figures show a force-sensing device 1 for measuring a force 2. The force 2 acts in a predetermined direction 3 on the location of force introduction 4 of the force-sensing device 1.

The location of force introduction 4 is connected by a yoke 5 to the free ends 8 of—in this embodiment—two parallel measuring springs 6, 7, which ends point in the same direction. A single or more than two parallel measuring springs can be provided also. The measuring springs 6, 7 are provided for force measurement. The connection between measuring springs 6, 7 and yoke 5 is designed as a rigid connection. The other end 9 of the measuring springs 6, 7 is positioned on a support 10 that can be rigidly connected to the machine frame 50. The force-caused deformation of the measuring springs 6, 7, i.e., the deformation caused by the force 2 to be measured, is detected at predetermined measuring locations 11a-11d and evaluated. The detection is expediently realized by means of wire strain gauges. When four identical wire strain gauges are used, a measuring circuit in the form of a Wheatstone bridge is expedient.

The difference between the embodiments of the FIGS. 1 to 4 and the FIGS. 5 to 7 resides in that in the case of the FIGS. 1 to 4 the measuring springs 6, 7 are always configured as so-called pure double bending beams.

This refers to two bending beams that are parallel to one another and spaced apart from one another and with one end are connected by the yoke 5 non-pivotally and with their other end 9 are rigidly connected to the machine frame 50.

In the case of the so-called double bending beam, there is no material between the two measuring springs so that these two measuring springs 6, 7 when the yoke 5 is loaded are always deformed to an S-shape with identical spacing relative to one another. The bending line itself has always two turning points where the curvature changes from right to left or from left to right.

In contrast to this, FIGS. 5 to 7 show a different embodiment.

The measuring springs 6, 7 are connected by a so-called shearing force sensor 6' at their common longitudinal center plane.

The shearing force sensor 6' is formed by a bore introduced into the force sensing device 1 on both sides that creates a kind of elastically deformable diaphragm because the bores on either side do not completely penetrate the force-sensing device 1.

In this way, there are also two parallel measuring springs 6, 7; however, they can no longer be referred to as double bending beam.

The bending line of these measuring springs 6, 7 is shown in FIG. 6 at the bottom.

The bending line has a qualitative extension with, in principle, two turning points.

However, it does not correspond to the course of a double bending beam because superposition effects, as in the case of a single bending beam, are unavoidable by means of the centrally arranged shearing force sensor.

Depending on the depth of the introduced bore shown in FIG. 5, such a bending line will approximate more and more the bending line of a single bending beam with decreasing depth.

Even though, such a configuration is of course suitable for the purposes of the invention.

It is important in this context that the yoke 5 is guided in parallel by means of at least one (additional) pair of bending springs 12, 13, 14 that are parallel to one another in a transverse direction 15 that is perpendicular to the direction 3 of the predetermined force 2.

In this connection, it should be noted that as a result of the measuring springs 6, 7 that represent together a double bending beam the yoke is already parallel-guided in that direction that leads to a displacement of the yoke 5 as a result of the force 2 to be measured. Since this is prior art, this will be not explained in more detail in this context.

It is however important that the yoke is provided with a parallel guiding action in a direction that is transverse to the direction 3 of the force 2 to be measured so that the yoke 5 is practically guided parallel to itself in two directions.

In this connection, the transverse direction 15 can be any direction that is transverse to the line of action of the force 2 to be measured.

Expediently, the parallel guiding action of the yoke 5 as a result of the additional parallel bending springs 12, 13, 14 is realized in that they are also rigidly connected to the yoke 5 or the support 10 and extend between the yoke 5 and the support 10.

The parallel guiding action of the yoke 5 in its two movement directions can be realized therefore by an additional arrangement of paired bending springs whose deflection plane is positioned in the transverse direction that is to be expected.

The basic principle of the invention is therefore in this connection to provide in the direction of the force 2 to be measured as well as in the transverse direction 15 measuring or bending springs that are at least arranged in pairs, respectively, that guide the yoke in parallel in both directions according to the principle of the double bending beam, respectively.

Since each double bending beam, as is known in the art, is deformed in the form of an S-shape, for deflection of the yoke under the respectively acting force a deformation work that is correspondingly high must be performed that imparts to the entire sensor or the entire force-sensing device 1 an excellent stiffness in two directions. The basic principle of the invention therefore resides in that for each of the deformation directions or load directions to be expected a pair of double bending beams are to be provided so that already for a minimal stroke a correspondingly high output signal is generated while at the same time the entire sensor has an excellent stiffness.

In order to be complete, it should however be mentioned that it is not mandatorily required to measure the occurring transverse forces also in the transverse direction. In this connection, it may be sufficient to significantly increase the section modulus of the bending springs 12, 13, 14 in the transverse direction in comparison to the section modulus in the deformation direction of the measuring springs provided for force measurement. Such a sensor would therefore be suitable for taking up transverse forces that are significantly greater than the nominal measuring forces.

The Figures, in particular FIG. 1, show thus a system of three parallel bending springs 12, 13, 14 that are all three deformed in parallel under the transverse load and, as a result of this, require a correspondingly high deformation work.

In addition, the Figures show, without limiting the invention to such geometric conditions, that the transverse direction 15 is positioned perpendicularly to the direction 3 of the predetermined force.

in this connection, it should be mentioned expressly that the transverse direction 15 can be positioned at any angle to the direction 3 of the force 2 to be measured as long as this angle is not 180 degrees.

The respective conditions depend on the machine requirements.

These can be predetermined in particular in regard to the relation between the direction of gravitation and direction of the resultant of the force to be measured upon deflection of an endless material in such a way that between the parasitic transverse direction as a result of dead load weight and the line of action of the force to be measured also angles of unequal to 90 degrees are present.

Figure 2:
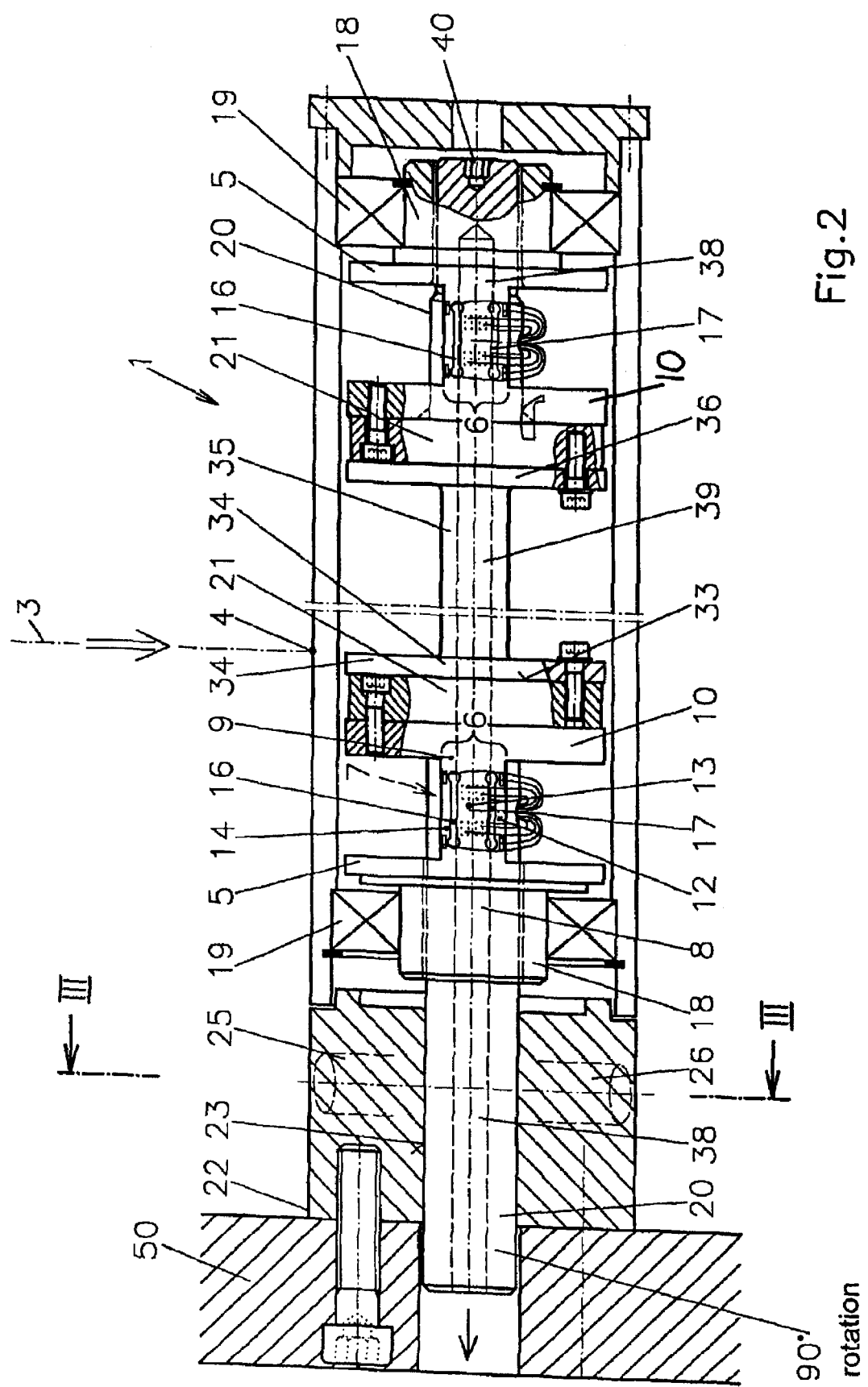
FIG. 2 an embodiment of the invention on a measuring roller.
Figure 4:
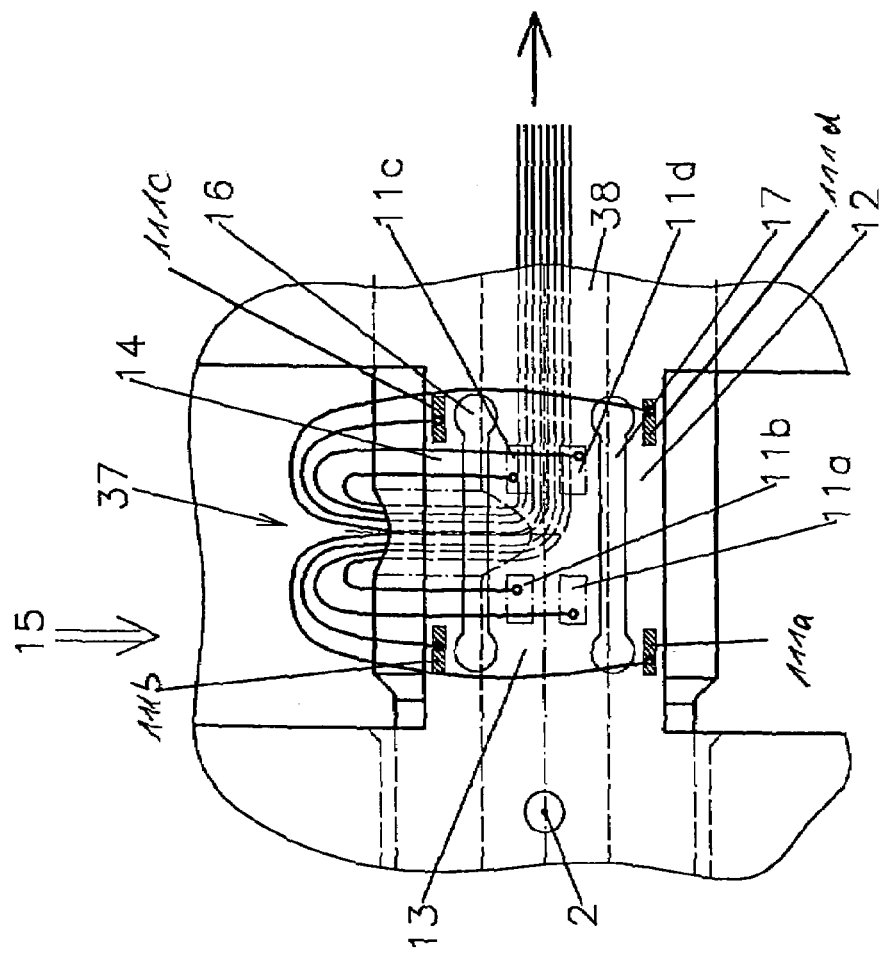
FIG. 4 details for placing the measuring cables.

As illustrated in particular in FIGS. 1, 2, and 4, the measuring springs 6, 7 provided for force measurement are penetrated by slots 16, 17 that extends in the longitudinal direction of the measuring springs 6, 7. The slot plane of the slots 16, 17 is essentially perpendicular to the transverse direction 15 so that in this way the measuring springs 6, 7 provided in fact for measuring the force 2 to be measured therefore also serve for parallel guiding the yoke 5 in the transverse direction.

In order to be complete, it should however be mentioned that the slot planes of the slots 16, 17 must not mandatorily be positioned perpendicularly to the transverse direction 15 but instead other slanted directions are theoretically also possible.

In supplementing the above, in particular FIG. 2 shows that the yoke 5 has an annular receiving zone 18 for a rolling bearing 19.

In this way, via the rolling bearing 19 the force 2 to be measured can also be introduced in the case of deflecting rollers, deflecting rolls or the like into the yoke 5.

In the illustrated embodiments, the inner diameter of the annular receiving zone 18 is however greater than the outer diameter of a mandrel 20 penetrating the yoke 5 so that the yoke 5 has clearance for deformation of the measuring springs 6, 7 while at the same time contact between the inner diameter of the annular receiving zone 18 and the outer circumference of the mandrel 20 ensures a reliable overload stop action.

This measure provides advantages in particular when the support 10 is annular and is penetrated by a mandrel 20 that is connectable rigidly to the machine frame 50. The mandrel 20 has outside of the support 10 a head 21 that, in turn, can be rigidly connected to the support 10.

This measure, alone or in combination with the additional bending springs 13, 14, 15, serves in particular for providing a modular configuration of a sensor system, comprised of several force-sensing devices 1 in connection with the requirement of a floatingly supported deflection roller for strip-shaped material, for example.

In this connection, it is proposed additionally that the mandrel 20 can be secured infinitely variably within an angular range of 360 degrees in any of many different rotational positions on the machine frame 50.

For this purpose, a clamping socket 22 is provided that is rigidly connected to the machine frame 50.

The clamping socket 22 has a fitted bore 23 that can be combined with the outer diameter of the mandrel 20 in a slight interference fit.

The fitted bore 23 is intercepted by a clamp bore 24 within which a clamping jaw pair is arranged that engages the mandrel 20 on two sides.

Figure 3:
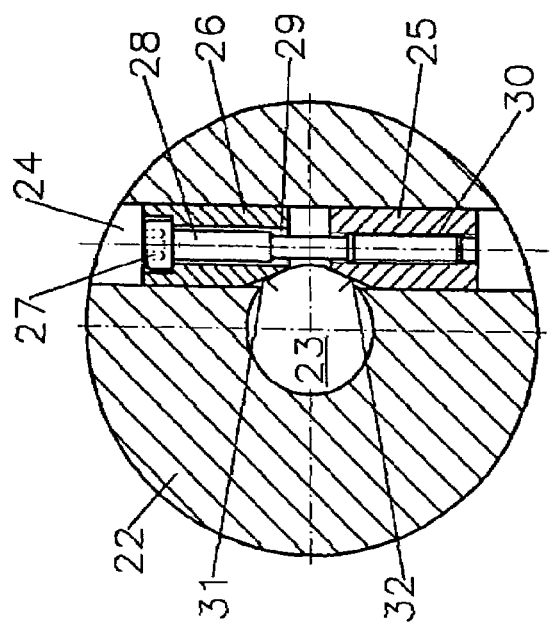
FIG. 3 a section view along the line III-III of FIG. 2.

When advancing the clamping jaw pair, wherein each clamping jaw engages one of two opposed sides of the mandrel 20, the mandrel 20 is clamped so as to be non-rotatable, wherein additionally during the clamping process even a minimal relative movement of the mandrel 20 is precluded because the clamping jaw pair 25, 26 symmetrically engage the mandrel 20 with their slanted surface 31, 32, respectively (FIG. 3).

For this purpose it is proposed to load the clamping jaw pair 25, 26 by a clamping screw 27 by means of which the two clamping jaws 25, 26 are advanced in the direction of the mandrel 20 toward one another.

In order for the clamping screw 27 to be recessed completely within the outer envelope of the clamping socket 22, it is proposed additionally to provide in the first clamping jaw 25 or the second clamping jaw 26 a through bore 29 while the other clamping jaw 26 or 25, respectively, is then provided with a threaded bore that matches the thread of the clamping screw 27.

Providing the head 21 of the mandrel 20 with a screwed-on flange 33 provides the advantage that by means of a counter flange 34 arranged at the end also an extension axle 35 in the sense of a freely projecting roll bearing can be provided in accordance with FIG. 2.

For this purpose, the extension axle 35 on its end facing away from the counter flange 34 should have an additional counter flange 36 on which mirror-symmetrical to the force-sensing device 1 on the machine side a further force-sensing device can be mounted.

In this way, by means of a sensor of a modular design, deflection rollers, measuring rollers or the like can be supported floatingly on the machine frame 50.

Since in this respect the option of transmitting the measuring signals by radio frequency to the exterior does not necessarily present itself, the mandrel 20 in the longitudinal area of the measuring springs 6, 7 should have a cable inlet opening 37 that is intercepted by a longitudinal bore 38 of the mandrel. Since the longitudinal bore 38 of the mandrel extends at least to one end of the mandrel 20, the measuring cables can be extended in this way easily to the exterior.

In the embodiment according to FIG. 2, the mandrel 20 that relates to the left force-sensing device 1 is completely penetrated by a bore because it serves also for passing to the exterior the measuring cables of the additional force-sensing device 1 shown in the right portion of the illustration.

For this purpose, the extension axle 35 is also provided with a bore across its entire length such that the axle bore 39 is aligned with the longitudinal bore 38 of the mandrel.

However, the mandrel 20 illustrated in the right half of the illustration does not require complete penetration by a bore because the measuring cables expediently must be passed to the exterior only in the direction toward the machine frame 50.

In addition to this, the mandrel 20 shown in the right portion of the illustration according to FIG. 2 has a key engaging surface 40 with which, when the clamping jaw pair 25, 26 is released, the force-sensing device 1 can be aligned such that the measuring axis coincides with the direction 3 of the force 2 to be measured.

The effect of gravity on the deformation behavior of the force-sensing device 1 resulting for this arrangement is accordingly compensated via the additional bending beams 12, 13, 14 and therefore has no effect on the measuring results.

Alternatively, the FIGS. 4, 6 and 7 show however also that the deformation of the additional bending beams 12, 13, 14 can also be detected by sensors 111*a-d*. The sensors 111*a-d* are arranged, as is known in the art, at locations of greatest expansion of the bending beams, i.e., at location where they assume their S-shaped deformation, and are appropriately provided with cables.

LIST OF REFERENCE NUMERALS

1 force-sensing device
2 force to be measured
3 direction of 2
4 location of force introduction
5 yoke
6 first bending spring
6' shearing force sensor
7 second bending spring
8 yoke side of 6, 7; free end of 6, 7

9 other end of 6, 7
10 support
11*a-d* measuring locations
12 additional bending spring
13 additional bending spring
14 additional bending spring
15 transverse direction
16 longitudinal slot
17 longitudinal slot
18 annular receiving zone of the yoke in the rolling bearing
19 rolling bearing
20 mandrel
21 head of mandrel
22 clamping socket
23 fitted bore
24 clamp bore
25 first clamping jaw
26 second clamping jaw
27 clamping screw
28 shaft of clamping screw
29 through bore
30 threaded bore
31 first slanted surface
32 second slanted surface
33 screwed-on flange
34 counter flange
35 extension axle
36 additional counter flange
37 cable inlet opening
38 longitudinal bore of mandrel
39 axle bore
40 key engaging surface
50 machine frame
111*a-d* additional measuring locations for transverse direction 15

What is claimed is:

1. A force-sensing device comprising:
    a yoke having a location of force introduction for a force to be measured acting in a predetermined direction on the location of force introduction;
    two measuring springs each having a first end rigidly connected to the yoke and elastically deformable by the force to be measured acting on the location of force introduction;
    a support adapted to be rigidly connected to a machine frame;
    the two measuring springs each having a second end arranged on the support;
    first measuring means that detect and evaluate a deformation of the two measuring springs caused by the force to be measured;
    wherein the two measuring springs each have two longitudinal slots extending between the yoke and the support, wherein the two longitudinal slots define three bending springs that are parallel relative to one another and spaced apart from one another and are connected to the yoke in such a way that the yoke is always guided in parallel in a transverse direction that is transverse to the predetermined direction of the force to be measured; and
    second measuring means provided for the three bending springs, the second measuring means detecting a transverse deformation caused by a force in the transverse direction.

2. The force-sensing device according to claim 1, wherein the three bending springs have a section modulus in the transverse direction that surpasses a section modulus of the two measuring springs in the predetermined direction of the force to be measured.

3. The force-sensing device according to claim 1, wherein the transverse direction is positioned perpendicularly to the predetermined direction of the force to be measured.

4. The force-sensing device according to claim 1, wherein a slot plane of the two longitudinal slots is perpendicular to the transverse direction, respectively.

5. The force-sensing device according to claim 1, wherein the yoke has an annular receiving zone for a rolling bearing.

6. The force-sensing device according to claim 1, further comprising a mandrel connectable rigidly to the machine frame, wherein the support is annular and the mandrel penetrates the support, wherein the mandrel has a head and is connected by the head to an outer end of the support.

7. The force-sensing device according to claim 6, wherein the mandrel is securable infinitely variably in a range of 360 degrees in any of many different rotational positions on the machine frame.

8. The force-sensing device according to claim 7, further comprising a clamping socket adapted to be connected to the machine frame and having a fitted bore and a clamp bore intercepting the fitted bore, the clamping socket further having a pair of clamping jaws arranged in the clamp bore, wherein a free end of the mandrel is mounted in the fitted bore of the clamping socket and wherein the clamping jaws engage two sides of the mandrel.

9. The force-sensing device according to claim 8, wherein the clamping jaws are penetrated by a clamping screw positioned outside of the fitted bore.

10. The force-sensing device according to claim 9, wherein the clamping screw has a shaft mounted in a through bore of a first one of the clamping jaws and wherein a second one of the clamping jaws has a threaded bore receiving the clamping screw.

11. The force-sensing device according to claim 6, further comprising an extension axle having a first counter flange, wherein the head of the mandrel has a screwed-on flange to which is connected the first counter flange of the extension axle.

12. The force-sensing device according to claim 11, wherein the extension axle has a second counter flange remote from the first counter flange, wherein an additional force-sensing device is mirror-symmetrically attached to the second counter flange, wherein the additional force-sensing device comprises:
    a yoke having a location of force introduction for a force to be measured acting in a predetermined direction on the location of force introduction;
    two measuring springs each having a first end rigidly connected to the yoke and elastically deformable by the force to be measured acting on the location of force introduction;
    a support adapted to be rigidly connected to a machine frame;
    the two measuring springs each having a second end arranged on the support;
    first measuring means that detect and evaluate a deformation of the two measuring springs caused by the force to be measured;
    wherein the two measuring springs each have two longitudinal slots extending between the yoke and the support, wherein the two longitudinal slots define three bending springs that are parallel relative to one another and spaced apart from one another and are connected to the yoke in such a way that the yoke is always guided in parallel in a transverse direction that is transverse to the predetermined direction of the force to be measured; and second measuring means provided for the three bending springs, the second measuring means detecting a transverse deformation caused by a force in the transverse direction.

13. The force-sensing device according to claim 12, wherein the mandrel in a longitudinal area of the has a cable inlet opening that is intercepted by a longitudinal bore of the mandrel, wherein the longitudinal bore of the mandrel extends at least to one end of the mandrel and opens at the end of the mandrel.

14. The force-sensing device according to claim 13, wherein the extension axle across an entire length of the extension axle is penetrated by an axle bore that is aligned with the longitudinal bore of the mandrel.

15. The force-sensing device according to claim 6, wherein the mandrel has a key engaging surface that is preferably concentrically positioned relative to a longitudinal axis of the mandrel.

16. The force-sensing device according to claim 1, wherein said two measuring springs are arranged parallel to one another and spaced apart from one another, wherein the first ends of said two measuring springs are non-pivotably connected to one another by the yoke and wherein the second ends are rigidly connected with the machine frame.

17. The force-sensing device according to claim 16, further comprising a shearing force sensor arranged between said two measuring springs, wherein a deformation of the shearing force sensor is detected on a surface of the shearing force sensor in a plane parallel to the predetermined direction of the force to be measured and evaluated.

* * * * *